(12) United States Patent
Falanga et al.

(10) Patent No.: US 12,032,827 B2
(45) Date of Patent: Jul. 9, 2024

(54) MEMORY DEVICES AND SYSTEMS FOR HOST CONTROLLED ENABLEMENT OF AUTOMATIC BACKGROUND OPERATIONS IN A MEMORY DEVICE

(71) Applicant: Lodestar Licensing Group LLC, Evanston, IL (US)

(72) Inventors: Francesco Falanga, Pozzuoli (IT); Danilo Caraccio, Buonalbergo (IT)

(73) Assignee: Lodestar Licensing Group LLC, Evanston, IL (US)

( * ) Notice: Subject to any disclaimer, the term of this patent is extended or adjusted under 35 U.S.C. 154(b) by 70 days.

(21) Appl. No.: 17/692,241

(22) Filed: Mar. 11, 2022

(65) Prior Publication Data

US 2022/0197504 A1    Jun. 23, 2022

Related U.S. Application Data

(60) Continuation of application No. 16/361,445, filed on Mar. 22, 2019, now Pat. No. 11,275,508, which is a division of application No. 15/131,447, filed on Apr. 18, 2016, now Pat. No. 10,282,102, which is a division of application No. 13/739,453, filed on Jan. 11, 2013, now Pat. No. 9,329,990.

(51) Int. Cl.
*G06F 3/06* (2006.01)
*G06F 12/02* (2006.01)

(52) U.S. Cl.
CPC ............ *G06F 3/061* (2013.01); *G06F 3/0619* (2013.01); *G06F 3/0659* (2013.01); *G06F 3/0665* (2013.01); *G06F 3/0689* (2013.01); *G06F 12/0246* (2013.01); *G06F 2212/7211* (2013.01)

(58) Field of Classification Search
CPC ...... G06F 3/061; G06F 3/0619; G06F 3/0659; G06F 3/0665; G06F 3/0689; G06F 12/00; G06F 13/00
See application file for complete search history.

(56) References Cited

U.S. PATENT DOCUMENTS

| | | | |
|---|---|---|---|
| 6,453,370 B1 * | 9/2002 | Stracovsky | G06F 13/1605 710/200 |
| 6,618,314 B1 | 9/2003 | Fiscus et al. | |
| 7,945,914 B2 | 5/2011 | Hasiuk | |
| 8,185,903 B2 | 5/2012 | Fulton et al. | |
| 2006/0184720 A1 * | 8/2006 | Sinclair | G06F 12/0246 711/E12.008 |
| 2006/0184722 A1 * | 8/2006 | Sinclair | G06F 3/0679 711/E12.008 |
| 2007/0274134 A1 | 11/2007 | Roohparvar | |
| 2008/0294813 A1 | 11/2008 | Gorobets | |
| 2008/0294814 A1 * | 11/2008 | Gorobets | G11C 16/349 710/62 |

(Continued)

*Primary Examiner* — Tuan V Thai
(74) *Attorney, Agent, or Firm* — TraskBritt (57) ABSTRACT

Memory devices might include an array of memory cells, a register, and a controller for access of the array of memory cells. The controller might be configured to autonomously perform background operations on the array of memory cells in response to the register storing a first value, and prohibit autonomous performance of the background operations on the array of memory cells in response to the register storing a second value different than the first value. The memory devices might be in communication with a host.

22 Claims, 5 Drawing Sheets

(56) References Cited

U.S. PATENT DOCUMENTS

| | | |
|---|---|---|
| 2009/0006719 A1 | 1/2009 | Traister |
| 2009/0132754 A1 | 5/2009 | Riska et al. |
| 2010/0131728 A1 | 5/2010 | Miyamae et al. |
| 2010/0287217 A1 | 11/2010 | Borchers et al. |
| 2010/0306446 A1 | 12/2010 | Villa et al. |
| 2012/0173792 A1 | 7/2012 | Lassa et al. |
| 2012/0260118 A1 | 10/2012 | Jiang et al. |
| 2013/0073797 A1 | 3/2013 | Chowdhury |
| 2015/0052292 A1 | 2/2015 | Mylly |
| 2015/0347451 A1 | 12/2015 | Lee et al. |

\* cited by examiner

MEMORY DEVICES AND SYSTEMS FOR HOST CONTROLLED ENABLEMENT OF AUTOMATIC BACKGROUND OPERATIONS IN A MEMORY DEVICE

RELATED APPLICATIONS

This is a continuation of U.S. application Ser. No. 16/361,445, filed Mar. 22, 2019, now U.S. Pat. No. 11,275,508, issued Mar. 15, 2022, which is a divisional of U.S. application Ser. No. 15/131,447, filed Apr. 18, 2016, now U.S. Pat. No. 10,282,102, issued May 17, 2019, which is a divisional of U.S. application Ser. No. 13/739,453, filed Jan. 11, 2013, now U.S. Pat. No. 9,329,990, issued on May 3, 2016, which are commonly assigned and incorporated in their entirety herein by reference.

TECHNICAL FIELD

The present embodiments relate generally to memory and a particular embodiment relates to host controlled enablement of automatic background operations in a memory device.

BACKGROUND

Memory devices are typically provided as internal, semiconductor, integrated circuits in computers or other electronic devices. There are many different types of memory including random-access memory (RAM), read only memory (ROM), dynamic random access memory (DRAM), synchronous dynamic random access memory (SDRAM), and non-volatile (e.g., flash) memory.

Flash memory devices have developed into a popular source of non-volatile memory for a wide range of electronic applications. Flash memory devices typically use a one-transistor memory cell that allows for high memory densities, high reliability, and low power consumption. Changes in threshold voltage of the cells, through programming of a charge storage structure, such as floating gates, trapping layers or other physical phenomena, determine the data state of each cell. Common uses for flash memory include personal computers, personal digital assistants (PDAs), digital cameras, digital media players, digital recorders, games, appliances, vehicles, wireless devices, cellular telephones, and removable memory modules.

In addition to performing access operations such as read and write, a non-volatile memory device also performs background operations. For example, the memory device might perform a wear leveling operation by moving data around within the memory array of the memory device. Another background operation might be a housekeeping operation that removes obsolete data in order to free up memory blocks to be erased and reused. These operations are performed in the background typically without the knowledge of the host and, in some embodiments, are performed automatically by the memory device (e.g., are initiated without being commanded by the host).

A problem can occur when these background operations are being performed by the memory device without the knowledge of the host. The host can interrupt the background operation by sending an access command or turning off the power to the memory device. This can result in lost or corrupted data and might require the memory device to start the background operation over, thus resulting in a loss of performance.

DETAILED DESCRIPTION

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Non-volatile memory can utilize different architectures including NOR and NAND. The architecture designation is derived from the logic used to read the devices. In NOR architecture, a logical column of memory cells is coupled in parallel with each memory cell coupled to a data line, such as those typically referred to as bit lines. In NAND architecture, a column of memory cells is coupled in series with only the first memory cell of the column coupled to a bit line.

Figure 1:
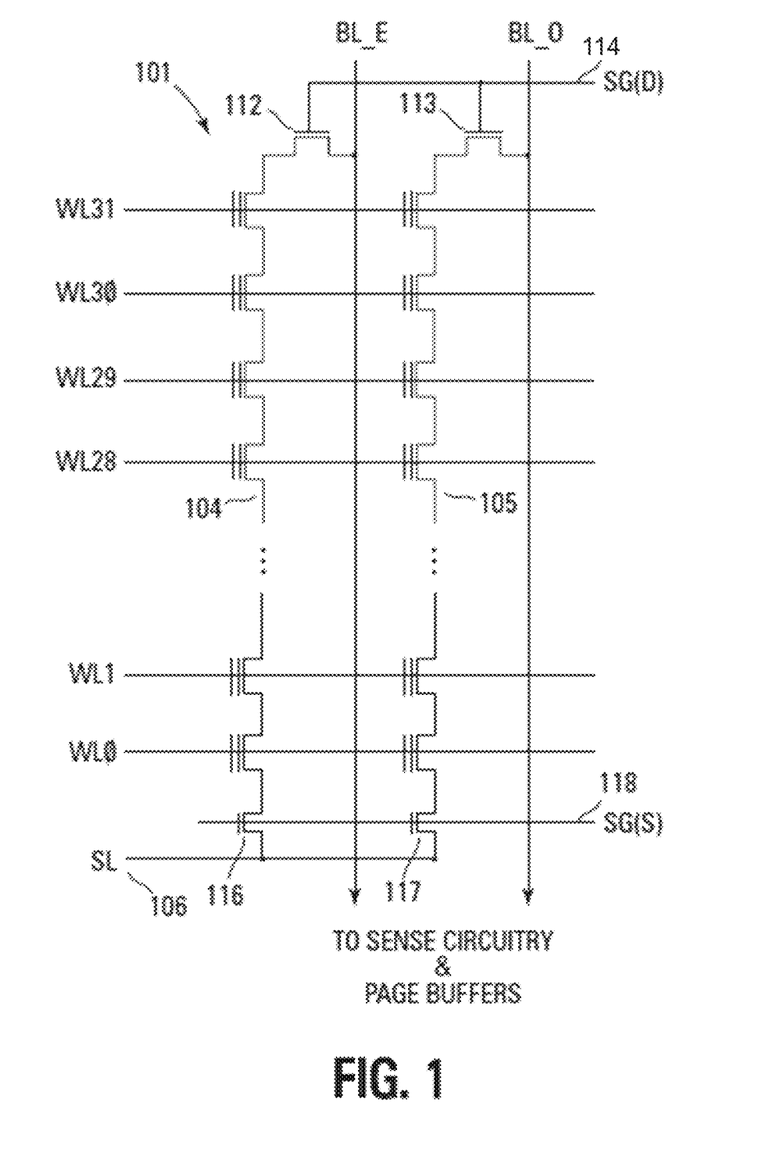
FIG. 1 shows a schematic diagram of one embodiment of a portion of a NAND architecture memory array.

FIG. 1 illustrates a schematic diagram of one embodiment of a portion of a NAND architecture memory array 101 comprising series strings of non-volatile memory cells. This figure is for purposes of illustration of a typical memory array only as a method for host controlled enablement of automatic background operations in a memory device and is not limited to the illustrated NAND architecture.

The memory array 101 comprises an array of non-volatile memory cells (e.g., floating gate) arranged in columns such as series strings 104, 105. Each of the cells is coupled drain to source in each series string 104, 105. An access line (e.g., word line) WL0-WL31 that spans across multiple series strings 104, 105 is coupled to the control gates of each memory cell in a row in order to bias the control gates of the memory cells in the row. Data lines, such as even/odd bit lines BL_E, BL_O, are coupled to the series strings and eventually coupled to sense circuitry and page buffers that detect and store the state of each cell by sensing current or voltage on a selected bit line.

Each series string 104, 105 of memory cells is coupled to a source line 106 by a source select gate 116, 117 (e.g., transistor) and to an individual bit line BL_E, BL_O by a drain select gate 112, 113 (e.g., transistor). The source select gates 116, 117 are controlled by a source select gate control line SG(S) 118 coupled to their control gates. The drain select gates 112, 113 are controlled by a drain select gate control line SG(D) 114.

In a typical prior art programming of the memory array, each memory cell is individually programmed as either a single level cell (SLC) or a multiple level cell (MLC). A cell's threshold voltage ($V_t$) can be used as an indication of the data stored in the cell. For example, in an SLC memory device, a $V_t$ of 2.5V might indicate a programmed cell while a $V_t$ of −0.5V might indicate an erased cell. In an MLC memory device, multiple $V_t$ ranges can each indicate a different state by assigning a bit pattern to a specific $V_t$ range.

Figure 2:
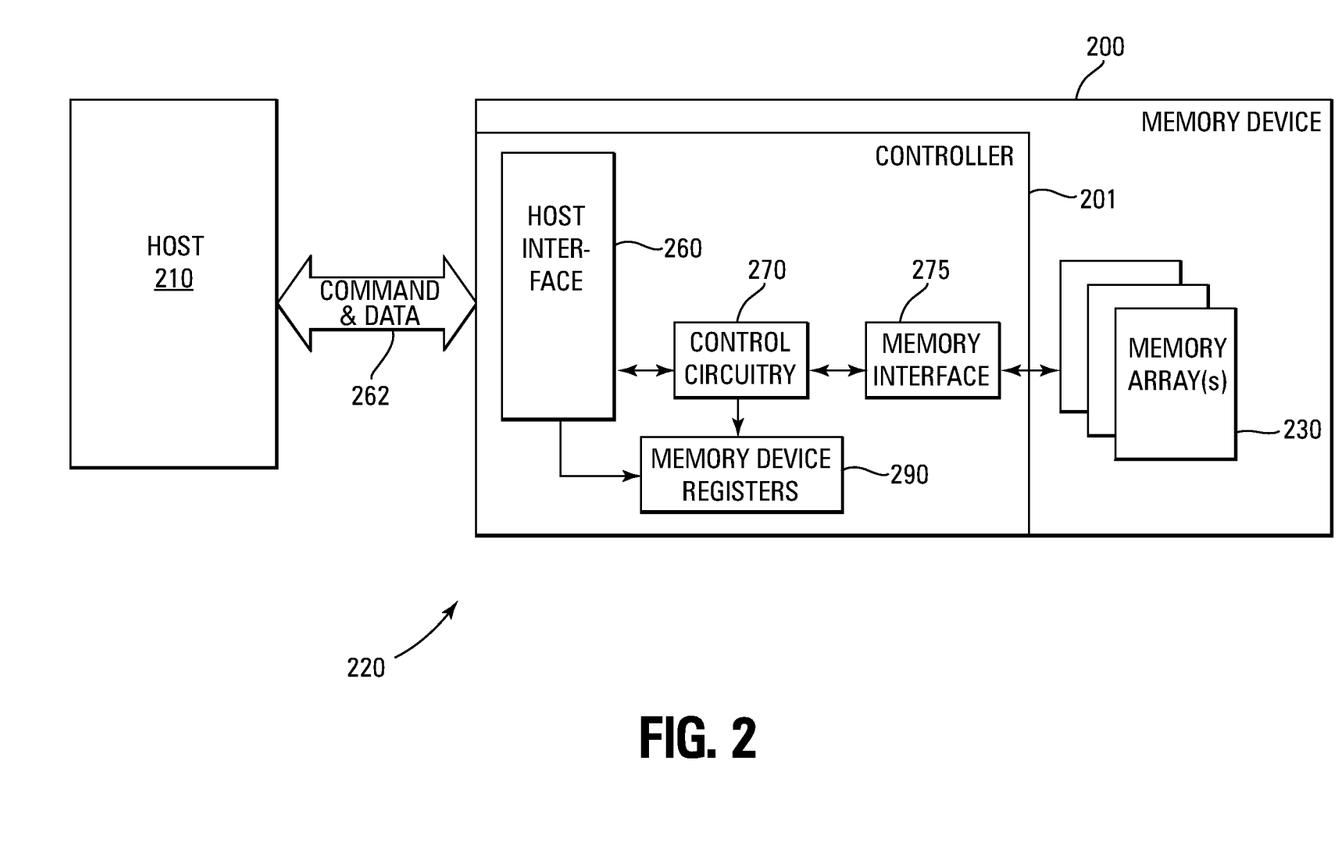
FIG. 2 shows a block diagram of one embodiment of a system that can incorporate a non-volatile memory device using a method for host controlled enablement of automatic background operations.

FIG. 2 illustrates a functional block diagram of a memory device 200 that can include a memory array architecture such as illustrated in FIG. 1. The memory device 200 is coupled to an external host 210 that acts as some type of controller. The host 210 can be configured to communicate commands (e.g., write, read), control signals, and data with the memory device 200 over a command and data bus 262 that connects the host 210 with the memory device 200. The memory device 200 and the host 210 form part of a system 220.

The memory device 200 includes one or more arrays 230 of memory cells (e.g., NAND architecture non-volatile memory cells). The memory array 230 is arranged in banks of word line rows and bit line columns. In one embodiment, the columns of the memory array 230 comprise series strings of memory cells. One example of a portion of such an array is illustrated in FIG. 1.

Host interface circuitry 260 provides an interface between the memory device 200 and the host 210. The host interface circuitry 260 might include circuitry such as buffers and registers.

Control circuitry 270, coupled to the host interface 260, operates in response to control signals from the host 210. These signals are used to control the operations of the memory array(s) 230, including data sense (e.g., read), data write (e.g., program), and erase operations. The control circuitry 270 may be a state machine, a sequencer, or some other type of control circuitry that is configured to control generation of memory control signals. In one embodiment, the control circuitry 270 is configured to control execution of the method for host controlled enablement of background operations.

Memory interface circuitry 275, coupled between the control circuitry 270 and the memory array(s) 230, provides bidirectional data communication between the control circuitry 270 and the memory array(s) 230. The memory interface circuitry 275 can include write circuitry, read circuitry, decoders, and buffers.

Memory device registers 290, coupled to the host interface 260 and the control circuitry 270, can be a part of the control circuitry 270 or separate from the control circuitry 270. The registers 290, as subsequently described, can be used to store control data for operation of the method for host controlled enablement of background operations. In one embodiment, the control circuitry 270 controls writing to and reading from the memory device registers 290 as directed by control signals from the host 210 over the command and data bus 262, as subsequently described. In another embodiment, the host 210 can write directly to and read directly from the registers 290 without control circuitry 270 intervention.

In one embodiment, the host interface 260, the control circuitry 270, the memory interface 275, and the memory device registers 290 are part of the memory device controller 201. Alternate embodiments of the controller 201 can include only a subset of these blocks or additional memory device circuitry.

The host can use the registers in the memory device to determine the status and capabilities of the memory device (e.g., status register), enable/disable automatic background operations of the memory device (e.g., enablement register), and/or set a minimum time period before the memory device can automatically perform (e.g., execute) or enables automatic background operations (e.g., time register). The registers can include different registers or different register bits in one register for enabling different background operations (e.g., allowing for selective enablement of different automatic background operations). The automatic background operations of the memory device can be any background operations performed in the memory device that do not require host initiation. For example, these background operations can include wear leveling, collection of bad or old data, unused memory block erasing, and/or other memory housekeeping operations.

In operation, the memory device register can be set to a first state (e.g., logical 0) to indicate that the memory device does not support host controlled enablement of automatic background operations and a second state (e.g., logical 1) to indicate that the memory device supports host controlled enablement of automatic background operations. If the host reads the state that indicates that the memory device does not support enablement of automatic background operations, this can indicate that the subsequently described registers (e.g., enablement, time) are not activated or not present. If the host reads the state that indicates that the memory device supports enablement of automatic background operations, this can indicate that the subsequently described registers are also activated and/or present.

In one embodiment, the memory device register is a read only register that is programmed prior to being used. For example, when the memory device is manufactured, the memory device register of a particular memory device can be programmed as supporting enablement of automatic background operations. In an alternate embodiment, the status register can be programmed at a time after manufacture depending on the application of the system.

If the host determines that the memory device supports enablement of automatic background operations, the host can write control data to a particular memory device register (e.g., enablement register) to enable/disable automatic background operations of the memory device. For example, the host can write a first state (e.g., logical 0) to the enablement register to indicate to the memory device that the memory device is allowed to initiate automatic background operations. In such an embodiment, the memory device can automatically perform the background operations during any host idle time and/or during execution of read/write operations and/or other operations initiated by the host.

The host can write a second state (e.g., logical 1) to the enablement register to indicate to the memory device that the host will periodically enable the background operations. This indicates to the memory device not to automatically perform the background operations. In such a configuration, only the host will initiate the background operations.

In one embodiment, the enablement register is a write/read register. This allows the host to not only write to the register but also to read it later to determine if it has been reset or written to by the memory device controller.

The host can also write to particular control registers (e.g., time registers) in order to set a particular time period that indicates to the memory device (e.g., controller) the minimum time period to wait after completing the operation commanded by the last received host command before automatically performing (e.g., initiating and/or executing) or enabling automatic background operations. The memory device can also decide not to take into account such time period set by the host and start its background activity before new arriving host commands are executed without any impact on performance. The time registers can be write/read registers so that, for example, the host can load one time register with an actual time period value that the memory device should wait after completing the operation commanded by the last received host command before automatically performing or enabling automatic background operations. A second time register can be loaded with the actual time period value's unit of measure (e.g., µs, ms, s). The memory controller can then use both time registers in combination to determine how long to wait before automatically performing or enabling automatic background operations. In an alternate embodiment, only one time period register is used and it is assumed to have a fixed unit of measure (e.g., µs, ms, or s).

In another alternate embodiment, the memory device might not have a time register. In such an embodiment, the memory device could have another particular register (e.g., start register). If host enablement of automatic background operations is supported by the memory device, the host can write control data (e.g., start data) to the start register whenever it is desired to start (e.g., initiate) background operations. This data can be automatically cleared by the memory controller after the background operations have begun to execute.

In yet another alternate embodiment, the memory device might have both the time register(s) and the start register. In such an embodiment, instead of waiting for the time period in the time register after completing the last operation commanded by the host before automatically performing the background operations, the memory device would wait for the time period in the time register after receiving the start data from the host before automatically performing the background operations.

In another alternate embodiment, the memory device can perform the automatic background operations in response to an explicit command from the host while also having the capability of automatically performing the automatic background operations without an explicit command from the host. In yet another embodiment, the time register(s) could be used to determine when to enable the automatic background operations instead of when to begin performing the automatic background operations.

Figure 3A:
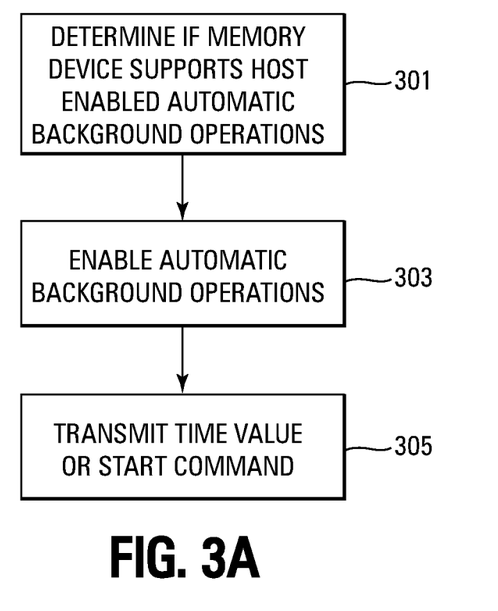
FIGS. 3A and 3B show flowcharts of embodiments of the method for host controlled enablement of automatic background operations.
Figure 3B:
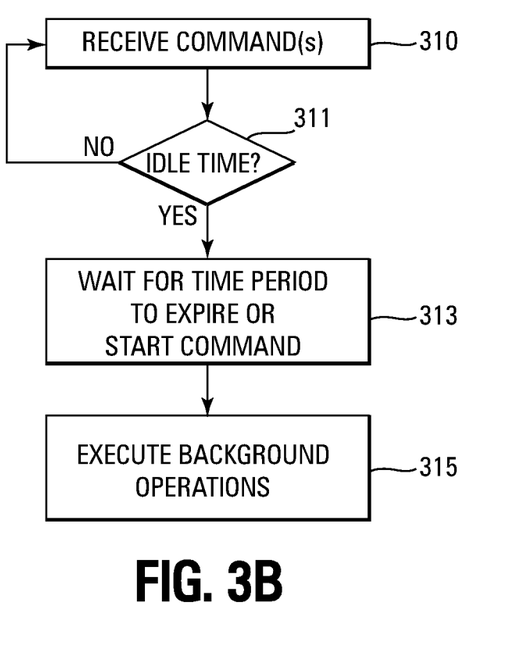

FIGS. 3A and 3B illustrate flowcharts of embodiments of the method for host enablement of automatic background operations in a memory device. FIG. 3A illustrates a flowchart of a method that is executed by the host. FIG. 3B illustrates a flowchart of a method that is executed by the memory device.

As illustrated in FIG. 3A, the host first determines if the memory device supports the host controlled enablement of automatic background operations 301. As previously described, this can be accomplished by reading a register of the memory device. If the memory device supports host controlled enablement of automatic background operations, the host can then enable the automatic background operations 303. This can be accomplished by writing control data to another register of the memory device. If the memory device has one or more control registers for time period values, the host can transmit the time period value to the memory device 305 along with, in one embodiment, the unit of measure value for the time period value. In another embodiment, the host can transmit a start command 305 to the memory device when the host is done sending other commands and wishes the memory device to begin start background operations.

As illustrated in FIG. 3B, the memory device receives commands from the host 310. The memory device then determines if any more commands have been received or if the memory device is experiencing an idle time 311 during which no commands are received from the host. If another command is received 310, the memory device executes the commands and again checks for idle time 311. If the memory device is experiencing idle time 311, it waits for the time period stored in the time register(s) to expire 313 prior to automatically performing the background operations 315.

In another embodiment, the memory device would be able to execute an automatic background operation at the same time as receiving host read/write commands. This could be accomplished without affecting the performance of the read/write operations. Such a memory device would not take into account any minimum idle time after completing the host commands but could initiate the automatic background operations even before the read/write are completed.

If the memory device does not support the time period value register (e.g., it is not present or is not activated), the memory device can determine if the last received command was a start command 313. Receiving this command indicates to the memory device to start the background operations.

Figure 4:
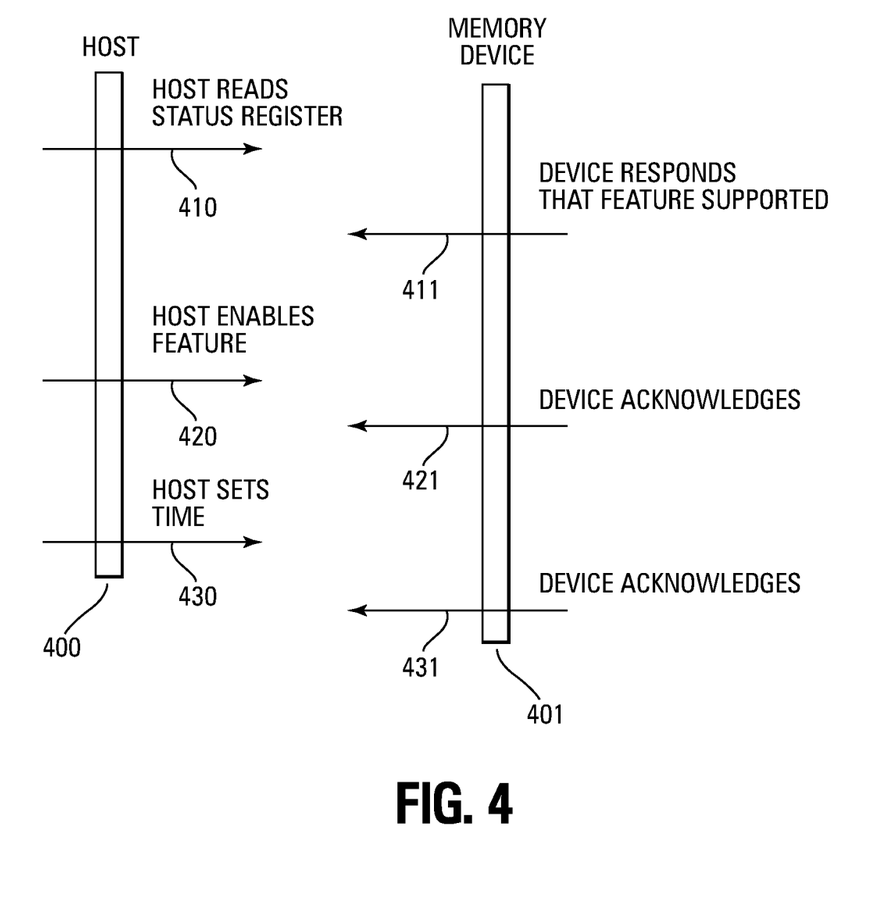
FIG. 4 shows a diagram of a check and configuration phase of the method for host controlled enablement of automatic background operations.
Figure 5:
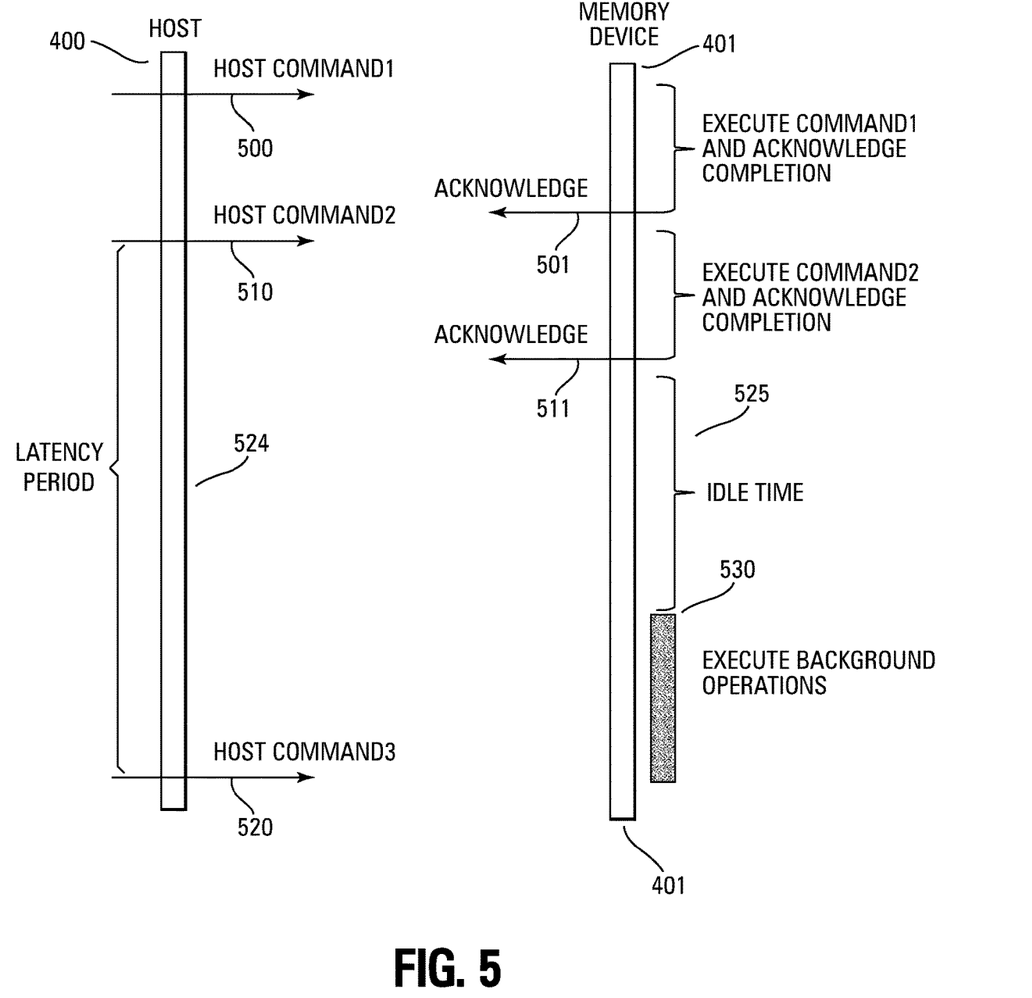
FIG. 5 shows a diagram of an execution phase of the method for host controlled enablement of automatic background operations.

FIGS. 4 and 5 illustrate examples of operation of the interaction between the host 400 and the memory device 401 as part of the method for host enablement of automatic background operations in the memory device. These diagrams are for purposes of illustration only as the interaction between the host and the memory device can occur differently.

FIG. 4 illustrates a check and configuration phase of operation between the host 400 and the memory device 401. The host 400 reads the status register 410 of the memory device 401 to determine if the memory device 401 supports host controlled enablement of automatic background operations. If the memory device 401 supports this feature, the memory device responds 411 with the register data indicating that this feature is supported.

If the feature is supported, the host 400 can then write control data to the enablement register 420 to configure this feature. The memory device 401 can then acknowledge 421 that the feature has been activated.

Once the automatic background operations have been enabled, the host 400 can transmit a time period value 430 to the memory device 401 to be stored in the time register. As previously discussed, this can be the minimum time period that the memory device 401 should wait prior to automatically performing the background operations. The memory device can then acknowledge receipt and setting of this time period with an acknowledgement message 431.

FIG. 5 illustrates an execution phase of operation between the host 400 and the memory device 401 as a result of the memory device 401 supporting the host controlled enablement of automatic background operations. This phase of operation assumes that the host 400 has determined that the memory device 401 supports the host controlled enablement of automatic background operations and that the memory device has been configured to enable this feature. For example, the method of FIG. 4 might already have occurred.

The host 400 can transmit COMMAND1 (e.g., read or write command) 500 to the memory device 401. The memory device 401 executes the received COMMAND1 and transmits an acknowledgement 501 to the host 400 upon completion. For example, the memory device 401 can transmit a completion message to the host 400 when the commanded operation has been completed.

The host 400 might transmit another command, COMMAND2 (e.g., read or write) 510 to the memory device 401. The memory device 401 executes the received COMMAND2 and transmits an acknowledgement 511 to the host 400 upon completion. For example, the memory device 401 can transmit a completion message to the host 400 when the commanded operation has been completed.

There can then be a latency period 524 in the host 400 where the host 400 is not transmitting commands to the memory device 401. Since the memory device 401 has already been instructed to not automatically perform background operations for a particular time period (e.g., time period value), the memory device 401 is in an idle state 525 for this time period. After the time period has expired, the memory device can automatically perform 530 the background operations (e.g., housekeeping operations). The automatic background operations are performed until they have been completed, the memory device loses power, or until another command is received from the host that interrupts the background operations. For example, the host 400 might transmit another command COMMAND3 520 to the memory device 401. Such a command would cause the memory device 401 to halt performance of the background operations in order to service the interrupt.

In an alternate embodiment where a time register is not used, the host 400 could transmit a start command to the memory device 401. The memory device 401 would remain in the idle state until receiving the start command. Upon receipt of the start command, the memory device 401 would start background operations.

CONCLUSION

In summary, one or more embodiments of the method for host controlled enablement of automatic background operations in a memory device can provide more reliable execution of the background operations since the host is now aware of when the memory device is performing housekeeping tasks. Since the host enables the feature and informs the memory device when it can automatically perform background operations, the host can know the best time to interrupt the memory device with a command. Additionally, the host will know when not to shut off power for the memory device while the background operations are being performed.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention.

What is claimed is:

1. A memory device, comprising:
   an array of memory cells;
   a first register;
   a second register storing a first value of the second register;
   a controller for access of the array of memory cells, the controller configured to:
      autonomously perform background operations on the array of memory cells in response to the first register storing a first value of the first register;
      prohibit autonomous performance of the background operations on the array of memory cells in response to the first register storing a second value of the first register different than the first value of the first register;
      write a second value of the second register, different than the first value of the second register, to the second register in response to control signals received by the memory device and indicative of a desire to write the second value of the second register to the second register; and
      initiate performance of the background operations on the array of memory cells in response to the second register storing the second value of the second register.

2. The memory device of claim 1, wherein the controller being configured to autonomously perform the background operations on the array of memory cells comprises the controller being configured to perform the background operations on the array of memory cells without being initiated by an external device.

3. The memory device of claim 1, wherein the controller is further configured to automatically clear the second register after initiating the performance of the background operations on the array of memory cells in response to the second register storing the second value of the second register.

4. The memory device of claim 1, wherein the memory device further comprises:
   a third register;
   wherein the second register is configured to be activated in response to the third register storing a first value of the third register; and
   wherein the second register is configured to be not activated in response to the third register storing a second value of the third register different than the first value of the third register.

5. A memory device, comprising:
   an array of memory cells;
   a first register;
   a second register; and
   a controller for access of the array of memory cells, wherein the controller is configured to:
      automatically perform background operations on the array of memory cells in response to the first register storing a first value of the first register;
      prohibit performance of the background operations on the array of memory cells in response to the first register storing a second value of the first register different than the first value of the first register, and the second register storing a first value of the second register; and
      perform the background operations on the array of memory cells in response to the second register storing a second value of the second register different than the first value of the second register.

6. The memory device of claim 5, wherein the controller is further configured to automatically clear the second register to store the first value of the second register after beginning to perform the background operations in response to the second register storing the second value of the second register.

7. The memory device of claim 6, wherein the controller is further configured to write a value to the second register in response to control signals received from an external device.

8. The memory device of claim 5, wherein the first value of the first register is a logical 0 value.

9. The memory device of claim 8, wherein the second value of the first register is a logical 1 value.

10. The memory device of claim 5, wherein the controller being configured to automatically perform the background operations on the array of memory cells in response to the first register storing the first value of the first register comprises the controller being configured to automatically perform one or more operations that the memory device is capable of performing without initiation by a device external to the memory device.

11. The memory device of claim 5, wherein the controller being configured to automatically perform the background operations on the array of memory cells in response to the first register storing the first value of the first register comprises the controller being configured to automatically perform one or more operations on the array of memory cells selected from a group consisting of wear leveling, collection of bad or old data, and erasing unused memory blocks.

12. The memory device of claim 5, wherein the controller is further configured to write a value to the first register in response to control signals received from an external device.

13. A system, comprising:
a host; and
a memory device in communication with the host, wherein the memory device comprises:
an array of memory cells;
a first register;
a second register; and
a controller for access of the array of memory cells;
wherein the host is configured to:
provide first control data to be written to the first register indicative of whether the memory device is prohibited from automatically performing, or permitted to automatically perform, background operations; and
provide second control data to be written to the second register in response to the host desiring performance of the background operations; and
wherein the controller is configured to:
automatically perform the background operations in response to the first register storing a first value of the first register;
prohibit performance of the background operations in response to the first register storing a second value of the first register different than the first value of the first register, and the second register storing a first value of the second register; and
perform the background operations in response to the second register storing a second value of the second register different than the first value of the second register.

14. The system of claim 13, wherein the first register is configured to be a write/read register to the host.

15. The system of claim 13, wherein the controller is configured to write the first control data to the first register in response to control signals received from the host.

16. The system of claim 13, wherein the memory device further comprises:
a third register;
wherein the host is further configured to:
determine a value of the third register; and
provide the first control data to be written to the first register in response to the third register storing a first value of the third register.

17. The system of claim 16, wherein the host is further configured to provide the first control data to be written to the first register only when the third register is storing the first value of the third register.

18. The system of claim 16, wherein the third register is configured to be read-only to the host.

19. The system of claim 18, wherein the third register is programmed when the memory device is manufactured.

20. The system of claim 13, wherein the controller being configured to automatically perform the background operations in response to the first register storing the first value of the first register comprises the controller being configured to automatically perform one or more operations on the array of memory cells that the memory device is capable of performing without initiation by the host.

21. The system of claim 13, wherein the controller being configured to automatically perform the background operations in response to the first register storing the first value of the first register comprises the controller being configured to automatically perform the background operations during host idle time.

22. The system of claim 21, wherein the controller being configured to automatically perform the background operations in response to the first register storing the first value of the first register comprises the controller being further configured to automatically perform the background operations during execution of operations initiated by the host.

* * * * *